United States Patent [19]

Jacobs

[11] Patent Number: 5,504,719
[45] Date of Patent: Apr. 2, 1996

[54] LASER HYDROPHONE AND VIRTUAL ARRAY OF LASER HYDROPHONES

[75] Inventor: Gordon B. Jacobs, Manlius, N.Y.

[73] Assignee: Martin Marietta Corporation, Syracuse, N.Y.

[21] Appl. No.: 507,528

[22] Filed: Sep. 19, 1974

[51] Int. Cl.$^6$ .................................................. H04R 23/00
[52] U.S. Cl. .................................................. 367/149
[58] Field of Search ................................. 340/4 R, 5 H; 250/216, 573, 574, 575; 332/7.51; 367/140, 149, 151, 178; 356/345, 358, 337, 338; 181/122, 110; 73/653, 657

[56] References Cited

U.S. PATENT DOCUMENTS

| | | | |
|---|---|---|---|
| 3,278,753 | 10/1966 | Pitts et al. | 340/4 R X |
| 3,474,253 | 10/1969 | Kessler | 250/216 |
| 3,866,055 | 2/1975 | Pike | 250/574 |
| 4,155,065 | 5/1979 | Stimler | 367/149 |
| 5,175,713 | 12/1992 | Ballard | 367/151 |

OTHER PUBLICATIONS

Time–Resolved Photoelectric Interferometry Of Very High Phase Resolution, K. K. Von Willisen (Brown–Boveri, Switzerland, OSA Meeting 1968).

Measurement Of Vibrations Using Lasers, H. Avsec, Q. Davis, Decca Radar, Ltd. Surrey, England, Clea Conference 1969.

Primary Examiner—Daniel T. Pihulic
Attorney, Agent, or Firm—Paul Checkovich; Stephen A. Young

[57] ABSTRACT

The present invention relates to a hydrophone and to a virtual array of hydrophones for sensing the amplitude, frequency, and in arrays, the direction of sonic waves in water. The hydrophone employs a laser beam which is focused upon a small "focal" volume of water in which natural light scattering matter is suspended and which matter vibrates in synchronism with any sonic waves present. The vibration produces a phase modulation of the scattered light which may be recovered by optical heterodyne and sensitive phase detection techniques. The sonic waves are sensed at locations displaced from the focusing lenses. Because of this remote sensing capability, the physical hardware of an array of hydrophones may be confined to a small area comparable to the dimensions of the lenses themselves while the sensing of the sonic waves virtually occurs at widely spaced, remote focal volumes. Thus, by combining the signals from these remote focal volumes, a virtual array of hydrophones may be formed whose dimensions are large enough in relation to the sonic wavelengths of interest to achieve high directionality but without the penalties of hydrodynamic drag usually associated with large area arrays.

14 Claims, 3 Drawing Sheets

LASER HYDROPHONE AND VIRTUAL ARRAY OF LASER HYDROPHONES

BACKGROUND OF THE INVENTION

1. The present invention relates to a novel hydrophone for the detection of sonic waves in water and to the formation of an array of such hydrophones for determining the direction of such sonic waves. The invention employs laser techniques and in particular the phase modulation of coherent illumination which occurs when light is scattered by particles vibrating under the influence of sonic wave motion.

2. Description of the Prior Art

It is known that waves are modulated when the path length between the source and a sensor is changing. The "Doppler" frequency shift, which is one such form of modulation, is a well known pnenomenon. For instance, it is the apparent change in frequency of a sonic wave when the source of the sonic wave is on a vehicle moving with respect to a listener. While the "Doppler" frequency shift was first known in respect to sonic phenomena, it is also known in respect to electromagnetic waves. In radio waves, for instance, a frequency shift also takes place when either an object reflecting waves back to a source, or the source of such waves is in motion. A typical circumstance in radar systems is one wherein a radar transmitter is located at a fixed ground location, while a wave reflecting object is a moving aircraft. If the radar wave reflected back to the transmitter is synchronously detected in such a way as to detect small differences in frequency from the transmitted wave, one will observe relatively low frequency modulations, which can be used to measure the speed of the aircraft.

While the Doppler frequency shift has been well known and widely used in respect to radar systems using radio frequency waves, its applications to light waves has been much more recent. It has never been doubted that such phenomena, which are applicable to radio waves, would also apply to light since both are electromagnetic waves. The effects were often confirmed by astronomical observations. To bring Doppler effects to practical use in respect to light there has been a rapid growth of light sources and of light processing technology. Laser light sources now exist of high absolute intensities, and of sufficiently high spectral purity and stability so that relatively small motion induced effects may be observed. With the advent of the laser has come a number of associated light detection techniques which have made possible a very precise examination of the light wave. The advent of photodetectors of high bandwidth has made it possible to heterodyne a light wave against itself and examine a relatively large range of shifts in frequency. The Bragg modulator, for instance, has made it possible to shift the frequency of the light wave by a fixed amount, typically from tens to hundreds of megacycles. Upon detection in an optical heterodyne system, the Bragg frequency shift has been used to provide a convenient carrier for amplifying and filtering any Doppler shifted light modulation terms.

The foregoing techniques for sensing Doppler frequency shifts have been applied to measure the speed of rotating machinery, aircraft velocities, the speed of airborne particulate matter, and the velocity of fluids containing seed particles.

The present invention, while also directed to the detection of motion induced modulation of light, is directed to motions on a much smaller scale, typically measured in angstrom or micron units; to motions which are vibratory in nature rather than simple velocities; and which small motions produce only a small recurring phase shift of the light rather than a long term frequency shift. In particular, the invention is applied to the detection and location of sonic waves in water.

In sonic wave detection, classical listening devices use piezoelectric or magneto-electric acoustic waves and electronic amplification to achieve very high sensitivities. Such sensitivities, however, must generally go unused since in the more important applications, such as to seagoing applications, the ambient levels of noise caused by sea animals and wave motion are many times higher than the thermal noise limits. When directionality is sought, piezoelectric devices are employed in large arrays. In general, piezoelectric arrays are not directional until the dimensions of the array become large in relation to the sonic wavelengths of interest. Large arrays are inconvenient, however, since in shipboard configurations the most desirable location is in the bow below the water line where the drag from a large array would be intolerable. In practice, it is not possible to make such an array directional at the low sonic frequency. It is the low sonic waves which are propagated with least absorption and where marine propulsion equipment produces the greatest sonic outputs. These low sonic frequencies normally lie in the range of from 10 to 200 hertz with the frequencies of from 50–100 hertz being one band of appreciable interest.

SUMMARY OF THE INVENTION

Accordingly, it is an object of the present invention to provide an improved sonic wave detector.

It is another object of the invention to provide a sonic wave detector having maximum usable sensitivity in actual sea conditions.

It is an additional object of the invention to provide a sonic wave detector sensing the phase modulation of coherent visible illumination.

It is a further object of the invention to provide a detector of sonic waves in water which senses the waves at a region spaced or remote from the detector.

It is still another object of the invention to provide a sonic wave detector which senses sonic waves in water by responding to the phase modulation of light scattered by particles suspended in the water and moving in synchronism with the sonic waves.

It is a further object of the invention to provide a detector of low intensity vibrations using the phase modulation of coherent illumination.

It is an additional object of the present invention to provide an improved sonic detection array.

It is a further object of the invention to provide an array of sonic wave devices for use in water having high directivity while being of small physical dimensions.

It is a further object of the invention to provide an array of sonic listening devices for use in water having maximum forward to backward sensitivity.

It is another object of the present invention to provide an improved detector array for use at sonic frequencies where absorption is minimum and target noise maximum.

These and other objects of the present invention are achieved in a novel laser hydrophone for the remote detection of sonic waves in water. It includes a laser, which produces an output of highly coherent monochromatic light and means for deriving a reference beam and the sampling beam. Means are further included for focusing the sampling beam upon a remote focal volume of water to illuminate light scattering matter naturally suspended in the water and moving in synchronism with the sonic waves. An optical detector is provided including optical means for forming the light scattered from the focal volume into a beam and coherently combining it with the reference beam to form an electrical heterodyne signal. Finally, phase detection means are provided coupled to the output of the optical detector for sensing the degree of phase modulation produced as a result of vibration of light scattering matter and thereby the intensity of sonic waves in the water.

In accordance with additional aspects of the invention, the focused sampling beam and the rays from the scattered light return beam are arranged to pursue generally separate paths in the water intersecting only at the focal volume. This arrangement improves the signal to noise ratio. In accordance with a further aspect of the invention the light is initially collimated as it leaves the laser, and the optical means for forming the scattered light return beam also collimate the scattered light. Thus, a common lens may be used for both the sampling beam and the scattered light return beam.

In accordance with a further aspect of the invention, the path length of the reference beam is adjusted so that the transit time of the reference beam from the laser to the photodetector approximates the transit time from the laser to the photodetector of light in the sampling and scattered light return beams. In addition, to provide ease in electrical amplification and filtering as well as to avoid sign ambiguities, a fixed frequency difference is created between the sampling and the reference beams by a Bragg modulator.

Further in accordance with the invention, a novel array of laser hydrophones is provided, the array having a virtual position in the water which is remote from the physical elements of the array and having virtual dimensions in the water unlimited by the dimensions of the array. The array comprises laser means, means for forming a plurality of pairs of mutually coherent reference and sampling beams, and means for focusing each of the sampling beams upon an associated focal volume of water. The dimensions of each focal volume are small in comparison to the sonic wavelengths of interest while the spacing between the focal volumes are comparable to the sonic wavelengths of interest. A plurality of optical detectors are provided, each associated with one pair of reference and sampling beams and each including optical means for forming the light scattered from the associated focal volume into a beam and coherently combining it with the paired reference beam to form an electrical heterodyne signal. A plurality of phase detection means are provided, one associated with each optical detector for sensing the magnitude of vibratory motion of the light scattering matter and thereby the intensity of the sonic waves in the corresponding remote focal volumes of water. Electrical signal processing means are then provided for combining the electrical outputs from each phase detection means to form a composite electrical signal representing the frequency, amplitude and direction of the sonic waves.

In accordance with other aspects of the invention, the electrical signal processing means includes delay means for inserting fractional wave delay increments from element to element in the array and summation means for combining the delayed signals from each element to achieve directivity as a function of the number of focal volumes and their spatial distribution. The arrays may be lineal arrays, area arrays or volumetric arrays. In accordance with a further aspect of a lineal array, the focal volumes are spaced along a line directed toward the target at approximately quarter wavelength intervals and element to element delays of one quarter wavelength are introduced, increasing from the back to the front of the array. Summation means are then introduced for combining the signals from each element so that signals arriving from the backward side of the array are cancelled while those arriving from the forward side of the array are re-enforced.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings in which:

FIG. 1A is an auxiliary view of the focal volume associated with the hydrophone.

DESCRIPTION OF A PREFERRED EMBODIMENT

Figure 1:
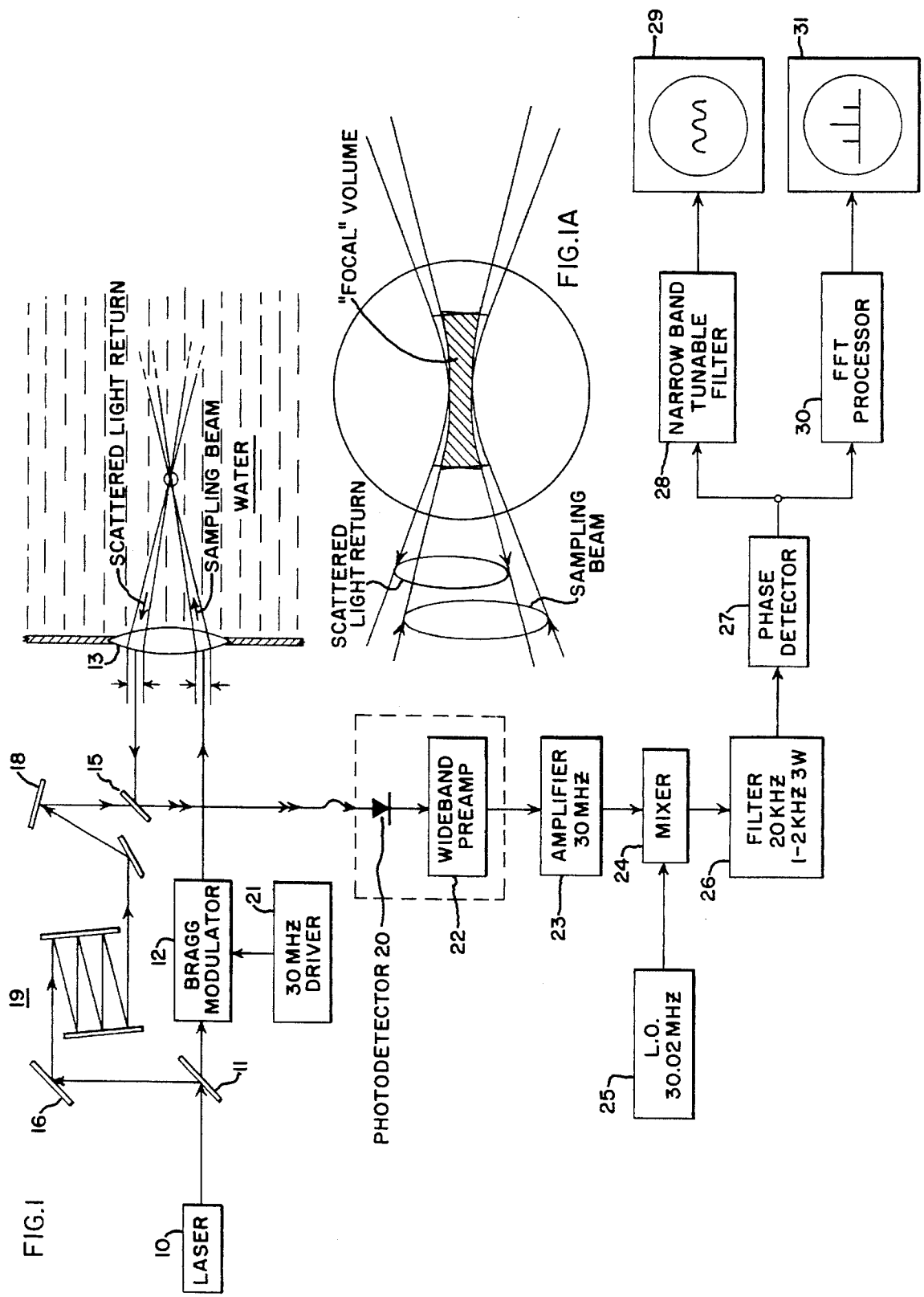
FIG. 1 is a simplified drawing primarily in block diagram form of a laser hydrophone for remote detection of sonic waves in water.

A laser hydrophone for detecting sonic waves in water is shown in simplified block diagram form in FIG. 1. The laser hydrophone has as its principal optical components a laser 10; a first beam splitter 11, a Bragg modulator 12; a focusing lens 13-focused upon a small volume 14 of water, the water containing natural light scattering matter; a second beam splitter 15; three mirrors 16, 17 and 18; a compensating path 19 for the reference beam; and a solid state photodetector 20 upon which reference and scattered light return beams are optically superimposed for heterodyning. A 30 megahertz electrical power source or driver 21 is provided for the Bragg modulator. The other electrical components of the hydrophone are coupled to the electrical output of the photodetector and comprise the elements 22–31. They provide the means responsive to the electrical output of the optical detector for sensing the phase modulation of the light produced when the light scattering matter is in vibratory motion from sonic waves in the water. The output indication of the hydrophone is normally on a cathode ray tube display (29 or 31) or a meter. The precise nature and functional features of the electrical components will be described subsequently.

The optical components 10–13, 15–20 form a focused sampling beam for illuminating a volume of water which is small in relation to the sonic wavelength of interest, intercept the scattered light return forming it into a beam, form a reference beam for heterodyning with the return beam, and coherently combine the two beams to produce an optical heterodyne at the detector, which contains phase modulation terms when sonic waves are present in the water. The laser 10 may be either a pulsed or CW type. It produces a beam of highly coherent monochromatic light, normally highly collimated, at a typical radiating power level of a half watt average power. Powers in the milliwatt range are normally inadequate since at this power level signals from natural water tend to fall within the "noise". Preferably, the wavelength selected is in the visible spectrum, near green for maximum water transmissivity. An argon laser is suitable.

Tracing the light paths through the optical components: the output beam of the laser impinges initially on the first beam splitter 11. A major portion of the beam passes undeflected through the beam splitter and it becomes the sampling beam directed into the water. A minor portion of the impinging beam is at the same time deflected by the beam splitter 11 into the mirror system 16, 17 and 18 and compensating path 19 for forming a reference beam suitable for heterodyning with the sampling beam at the photodetector.

After the laser output has been divided, the sampling beam proceeds to the Bragg modulator 12 for frequency shifting. The Bragg modulator is energized by the 30 megacycle driver 21 to offset the frequency of the sampling beam by 30 megacycles. This establishes the frequency at which the optical heterodyne subsequently occurs at the photodetector. This frequency selection is convenient for further electrical amplification and filtering and it provides a suitable carrier for the phase modulation of the sampling beam produced by water borne light scatterers vibrating under sonic wave influences.

The sampling beam, now frequency offset, then continues to the main focusing lens 13 where it impinges in a path parallel to the axis of the lens but displaced from the center of the lens. The focusing lens is at the water interface and focuses the sampling beam upon the small volume (14) of water. The dimensions of this "focal" volume 14 are of particular interest and should be small in relation to the sonic waves whose phase is being measured. The lens 13 is an accurate lens of low effective relative aperture, typically 500, having a focal length in water of from 1 to 100 meters. The focal length is selected to be suitable for observing sonic wave motion at the desired remoteness from the physical hardware.

The focusing lens 13' in the FIG. 1 embodiment also collects the return light scattered by the focal volume 14. The light return is collected by the lens 13 and collimated into a beam, and the collimated return beam then impinges on the second beam splitter 14 which deflects the return beam into the solid state detector 20. Only a small portion of the lens 13, also displaced from its center, is utilized in collecting the scattered light and forming it into a beam.

At the second beam splitter 15, both the scattered return beam and the reference beam are combined for optical heterodyning. The reference beam initiated in the first beam splitter 11 also proceeds to the photodetector 20. It is reflected by successive mirrors 16, 17 and 18 and traverses the compensating path 19 to the second beam splitter 15. Passing undeflected through the beam splitter 15, the reference beam pursues a path to the solid state detector 20 coincident with the scattered light return. At the detector, the optical heterodyne is formed between the two beams. This heterodyne contains phase modulation terms produced by any sonic waves passing through the "focal volume".

The "focal volume" is that portion of the water into which the sampling beam is focused and from which scattered light is derived for application to the photodetector. The focal volume is the region in which a sonic wave is sensed.

As noted above, the return light scattered by the "focal volume" 14 is collected by the focus lens 13 which collimates it for convenient application to the photodetector 20. The illuminating and collecting optics define the size of the "focal volume" in the following manner.

The useful part of the scattered light, which we will now call the scattered light return, is that part of the scattered light which is coincident with the reference beam backwardly projected from the photodetector 20, beam splitter 15 and lens 13 into the focal volume. Due to the heterodyne detection process, only that part of the scattered light which is coincident with the backward projection of the reference beam is useful in forming an electrical output at the photodetector. Before collection, the rays which are used in forming the scattered light return beam are those coming from the focal region defined by the backward projection of the reference beam. After collection by lens 13, since the diameters of the collimated sampling and reference beams are equal, and since the same lens 13 is used for focusing and collimating, the collimated scattered light return beam is also equal to the diameter of the other two. Thus, the "focal volume" in which sonic waves are sensed, is the region common to the focused sampling beam and the "virtual" or backwardly projected reference beam.

Assuming phase front matching and optimum superposition of the sampling and reference beams at the detector, the diameter of the effective focal volume is equal to the wavelength of light in water, times the focal distance in water, divided by the diameter of the laser sampling beam at the lens. In other words, the diameter of the focal volume is equal to the wavelength of light in water times the effective F number of the focusing lens. This dimension is not appreciably affected by any small angles by which the sampling and return beams intersect in the focal volume.

The depth of the "focal volume" is equal to the depth of the volume common to the focused sampling beam and the virtual reference beam. The depth of the "focal volume" is larger than the diameter of the focal volume, and yet is small in respect to the acoustic wavelengths of interest. It is slightly reduced by the above noted skewing of the sampling and return beams. The depth of the focal volume is numerically equal to the square of the effective F number of the focusing lens times the wavelength of the light in water.

At this point it should be noted that the signal to noise ratio, neglecting absorption, is independent of the distance of the focal volume. As the F number becomes smaller and therefore the intensity larger at the illuminated region, the number of particles available to scatter back light becomes smaller. On the other hand, as the focal length increases, the focal volume increases and the number of scattering particles increase, although the intensity of illumination of each particle falls off. Thus the two factors, neglecting absorption by the water, cancel each other out. However, the focal volume should be kept as large as possible, consistent with being small compared to an acoustic wavelength in order to reduce the noise due to variations in the distribution of particles.

During the time when the particles are "frozen" in respect to Brownian motion, the wave fronts of the scattered beam return will be constant in amplitude and phase at the detector and the system noise will be limited only by so-called quantum noise. (The statistical variation in arrival of photons .) However, where the sampling period permits the particles within the focal volume to move with respect to each other, amplitude and phase modulation of the phase fronts introduce an additional noise term. It is this noise term that ultimately limits the integration time of the system.

Assuming that the effective F number of the lens 13 is about 500 and that the ratio of the beam separations at the lens (13) to the (collimated) beam diameters is slightly under 3 (a typical value), the depth of the focal volume will be about 1 centimeter long and the diameter of the focal volume substantially less. Since sonic waves of low frequency (e.g., 60 hertz) corresponding to wavelengths of about 80 feet are of interest for this application, these dimensions do not represent a source of error in acoustic phase measurement.

Arranging the sampling and return beams to intersect (rather than to be coincident) in the "biaxial" manner improves the signal to noise ratio of the phase measurement. Since the two beams are non-coincident in the water except in the focal region, light scattered from the non-focal volume of water is prevented from contributing significantly to the light collected in the photodetector. Thus, light from those regions of the water where the scattering wave is out of phase in an optical or an acoustical sense is not collected. Since the energy collected in the tiny focal region represents 50% of that available from all the illuminated volume, this type of volume selection is very efficient and leads to a maximum signal to noise ratio.

The optical arrangement so far described, ideally allows a congruent superposition of the phase fronts of the scattered return beam upon the reference beam at the photodetector 19 and allows for arrival of the two beams in like polarization and with a like time delay.

Recapitulating, the sampling beam (prior to lens 13) is collimated and normally travels in a path which is parallel but displaced from the axis of the focusing lens 13. The beam is then focused upon a small volume 14 of water which can be thought of as a potential source of light for the return beam. When scattering particles are present in this volume, a natural condition, they become a secondary light source, scattering illuminating light back into the focusing lens. Since the scattered light source is generated at the focus of the lens 13, the scattered light return is collimated by an off center portion of the lens 13. Assuming that the laser output is accurately collimated as it impinges on the lens 13 and focuses in the focal plane, and that the reference beam passing through the mirror system 16–18 and compensating path 19 is also collimated, then the wavefronts of the scattered light return and of the reference beam impinging on the solid state detector 20 will both be flat. Being flat, adjustment of the mirrors to bring the wavefronts of the reference beam and the wavefronts of the return beam into a parallel relation as they impinge on the detector 20 provides for accurate phase matching superposition. The polarization directions, while not indicated in the foregoing drawing, are also preserved by the indicated configuration so as to be parallel to one another at the photodetector.

The final requirement of the optical paths at the photodetector is that the difference in length between the reference beam and the "effective" round trip path length of the sampling beam in the water not exceed the "coherence length" of the laser. This problem is solved by providing the compensating path 19. One convenient means is a pair of adjustable mirrors between which the beam is reflected by a controllable number of times. The adjustment is set to increase the length of the reference beam to the point where the transit times of the reference and sampling beams from the laser to the photodetector are approximately equal.

Assuming phase front matching at the solid state photodetector 19, and that the other conditions noted above are met, an optical heterodyne is formed having a frequency equal to that of the Bragg modulator, namely 30 megahertz. Thus, in addition to the frequency shift provided by the Bragg modulator, any vibratory motion of the scattering matter in the focal volume will produce a phase modulation of the sampling beam. After optical detection, the phase modulation will be on an electrical carrier at the Bragg modulation frequency. The electrical apparatus comprising elements 27 through 31 is directed toward measuring the very small phase shifts which are produced by this vibratory motion. The electrical apparatus will now be described.

The photodetector 20 produces an electrical signal output having terms resulting from the phase modulation process and occurring in the vicinity of the Bragg modulator frequency. The frequencies of both the carrier at the Bragg frequency and the phase modulation terms are well within the bandwidth capabilities of the photodetector. Since good photodiodes may reproduce optical heterodyne terms up to several hundred megacycles and have nearly unity quantum efficiency, a nearly ideal optical heterodyne at 10 megacycles is readily achieved. The optical detection process produces phase modulation terms of very low angular amplitudes (milliradians). Where there is a Doppler shift due to a fairly steady relative velocity, such as gravity wave motion or platform motion, depending on that velocity, the modulation terms may also be shifted in frequency by from several to a few tens of kilohertz from the selected Bragg modulation frequency. This frequency shift must be kept to a small value consistent with the band passes of the electrical output filters, a preferred means being an automatic frequency control (not shown). In addition to having a low phase deviation, the scattering process terms are also at a very low amplitude and readily obscured by noises such as photon noise or detector thermal noise. Accordingly, filtering and substantial preamplification are necessary.

The electrical output of the photodetector 20 is therefore coupled to a wideband preamplifier 22 which has a wideband gain of 10 to 20 decibels from d.c. up to the desired heterodyne frequency. The wideband preamplifier is arranged in close proximity to the photodetector and is typically placed in a common shielded package permitting the signal level to be amplified to a level above that of any stray interference before substantial stray noise pick up can occur. This intimacy of assembly is indicated by the common dotted line surrounding both the photodetector 20 and the preamplifier 22.

After preamplification in 22 to a suitable level, the optical heterodyne signal is next applied to an amplifier at the 30 megahertz frequency having a bandwidth of 4 megahertz. This amplifier provides about 80 db of gain and filters out noise and undesired modulation terms outside the four megahertz pass band. The amplifier 23 may take the form of a conventional intermediate frequency amplifier suitable for radar applications (Instruments for Industry M-230/180-2003).

The output of the amplifier 23 is fed to a diode mixing bridge 24 where it is mixed with signals from a highly stable local oscillator 25. Since a high degree of final selectivity is desired, the local oscillator is offset from the 30 megacycle center frequency by 20 kilohertz, a very low value. A suitable mixer is of the double balanced design for feedthrough isolation (Hewlett-Packard Model HP-10514A). A suitably stable oscillator is the Hewlett-Packard 606A.

The 20 kilohertz signal produced by the mixer 24 is then applied to a filter 26 (wave analyzer FIP 310A) having a bandwidth of from 1 to 2 kilohertz for further noise reduction. At the output of the filter 26, the amplification and filtering of the signal is essentially completed. At this point the predetection S/N must be well above unity in order that the phase detector operate properly. The subsequent phase detection inherently provides a further increase in S/N when this condition is met. Phase detection recovers the phase modulation resulting from vibration of the scattering matter under sonic wave influences. For phase detection, the signal is supplied to phase detector 27.

The phase modulation which is produced by typical acoustic signals is very small, being on the order of a few milliradians corresponding to angstrom ($10^{-8}$ cm) spacial displacements of the scattering particles. The phase detection process must therefore be very sensitive in its ability to detect small changes in phase. A suitable device is the General Radio Type 1142-A , Frequency Meter and Discriminator.

In the phase detector 27, the a.c. waveform containing the phase modulation information is applied successively to a high gain amplifier, a limiter and a Schmidt trigger. In a typical case in which the sonic wave being detected is of 50 Hz, the Schmidt trigger produces a pulse at each positive going zero crossing of the 20 Khz carrier. As the phase of the 20 Khz signal varies at the sonic rate, the Schmidt trigger produces variations in the spacings of the pulses. A monostable multivibrator is provided following the Schmidt trigger which produces constant amplitude pulses of constant width at the 20 Khz rate of variable spacing to provide a variation in the average. The third element in the phase detector 27 is an integrator supplying a variable output current to a capacitor. The average voltage on the capacitor increases as the duty cycle varies corresponding to the phase modulation. The output waveform of the integrator also contains a succession of 20 Kc transients superimposed on that average. The 20 Khz pulses are removed by a smoothing filter, thus transmitting only the 50 Hz modulation desired.

The output of the phase detector 27 is then applied to one of two output channels. The first is a narrow band, tunable filter 28 coupling its single signal output to an oscilloscope 29. The narrow tunable filter 28 is selected to pick up a single frequency to which it is tuned, normally with a Q on the order of 100 to 1.

The peak to peak amplitude of the waveform on the oscilloscope 29 represents peak to peak frequency deviation of the 20 Khz carrier. The frequency of this waveform occurs at the acoustic frequency of interest (e.g., 50 cycles). The phase modulation (peak to peak rms) and therefore the acoustic intensity are derived from these data. Thus, output from a frequency meter may be calibrated at an indicating oscilloscope to indicate phase or acoustic amplitude of the sonic waves in the water.

If a view of the total spectrum is desired, then the output is applied to a fast fourier transform filtering arrangement 30 which produces an output indication 31 in a frequency synthesizer corresponding to all of the sonic frequencies available.

The magnitude of particle displacement produced by the sonic wave in the water may be read directly by observing the magnitude of the output voltage at 29 as noted above if it is calibrated. In the frequency synthesizer (31) output, the particle displacement may also be determined by observing the calibrated heights of the separate frequency components of the signal. If a spectrum analyzer is inserted prior to the phase detector 27, acoustic intensity calibration can be achieved by measuring these components and employing the Bessel function coefficients. Thus, the system's acoustic wave measurement is self-calibrating without resort to additional hydrophones or other calibrating apparatus.

In practice, displays 29 and 31 are normally calibrated using this spectrum analysis calibration technique at high acoustic amplitudes (1000 Å peak to peak particle motion). Subsequent readings depend upon the linearity of the 29 and 31 displays to provide signal amplitude measurements at low amplitude (1–100 Å).

The embodiment illustrated in FIG. 1 utilizes a single laser and examines the passage of a sonic wave through a remote single "focal" volume of water. In applications where sound from distant sources is being sensed, the lower sonic frequencies in the vicinity of from 10 to 200 cycles are of particular importance because of the reduced acoustic absorption of the water at these frequencies. If one seeks directivity, a single focal volume is of little use, and one must sense the phase of the sonic waves at a plurality of well separated focal volumes, using principles similar to those of multi-element directional radio antenna. The technique provides nearly zero backward wave sensitivity. The technique depends upon sensing the passage of the sonic wave at a linear succession of focal volumes spaced along a line between the observer and the target at quarter wavelength intervals at the sonic frequency of interest. Cancellation of the backward wave is achieved by inserting quarter wave acoustic delay increments as one proceeds element by element from the back to the front of the array. The foregoing geometry and delay measures at the same time reinforce the forward wave.

Figure 2:
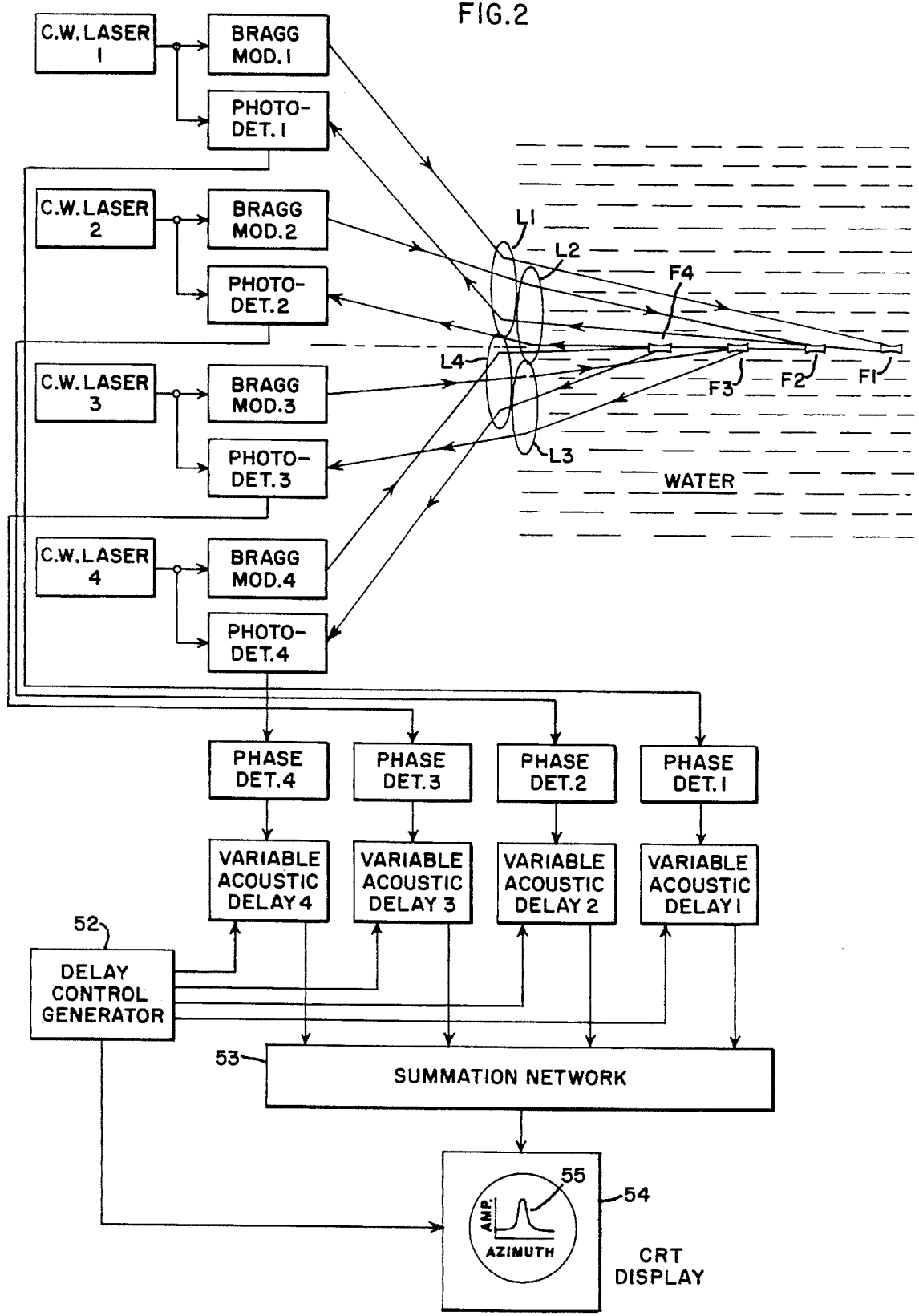
FIG. 2 is a lineal array of laser hydrophones having maximum forward to backward response.

A directional lineal array of laser hydrophones using these principles to sense sonic wave passage through four remote focal volumes of water is illustrated in FIG. 2. It is operable in the low sonic frequency range and requires no physical equipment projecting into the water beyond the lenses used to transmit and receive scattered light. It may either be mechanically or electrically scanned.

In FIG. 2, four laser systems are shown each generally similar to the individual system of FIG. 1, except that after phase detection, the signals combined from the separate systems are differentially delayed, and then summed prior to application to the display apparatus. The four systems include four CW lasers 1, 2, 3 and 4, each coupled through a separate Bragg modulator 1, 2, 3 and 4 to transmitting and receiving lenses L1, L2, L3 and L4. The lenses L1 to L4 are arranged respectively to focus the transmitted laser beams on focal volumes of water F1, F2, F3 and F4. The volumes are numbered in order of decreasing remoteness. The lenses are also arranged to collect the light derived from the remote focal volumes F1, F2, F3 and F4, respectively, and to direct the collected light respectively, upon the photodetectors 1, 2, 3 and 4. Assuming that the lasers 1, 2, 3 and 4 are collimated and therefore that the sampling beams impinging on the lenses L1, L2, L3 and L4 and the corresponding reference beams are collimated, then the focal volumes of water F1, F2, F3 and F4 will be located at the focal planes of the respective lenses. Similarly, the scattered return beams obtained from the focal volumes F1, F2, F3 and F4 will be collimated after collection.

The lenses may be grouped in a small circular cluster as shown in FIG. 2 wherein the actual offset of each lens from the axis 51 (defined as the line along which the successive focal volumes are spaced) is only slightly longer than the radii of the individual lenses. Thus, the actual offsets are a few milliradians rather than the tens of degrees illustrated in the drawing. The photodetectors 1, 2, 3 and 4 then convert the optical heterodynes into electrical signals and apply them to the phase detectors 1–4. After phase detection, the separate signals from the separate focal volumes F1–F4 are coupled respectively to the acoustic delay elements 1, 2, 3 and 4. In a mechanically scanned configuration, the delay elements may be fixed for each frequency of interest. (If an electrically scanned configuration or operation over a variety of frequencies is desired, the acoustic delays are subject to electrical delay control.) The acoustically delayed outputs of the delays 1, 2, 3 and 4 are then applied to the summing network 53 whose output controls the vertical deflection of the cathode ray tube display 54. The horizontal sweep of the display is synchronized with the scanning means under the control of the delay control generator 52. The normal output display is with amplitude plotted for each target against azimuth angle as shown at 55.

The variable delay elements 1, 2, 3 and 4, the delay control generator 52, the summation network 53, and the CRT display 54 may use conventional principles and may take any of several well known forms. While the foregoing description has been of the simpler mechanically scanned single frequency configuration, it should be understood that the foregoing array configuration is susceptible of being both electrically scanned and operated over a range of sonic frequencies.

Thus, the four laser systems shown in FIG. 2, whose hardware terminates at the water interface in a cluster of four optical lenses may be used to create an array of hydrophones, which by sensing the passage of sonic waves through spaced remote elements in the water are "virtually" at these remote locations. The angular discrimination of the "virtual array" of hydrophones will be a function of the number of remote focal volumes whose signals are combined to form the total signal and the distances between the focal volumes measured in sonic wavelengths. The operation and design of the virtual array is in accordance with classic linear array theory.

Figure 3:
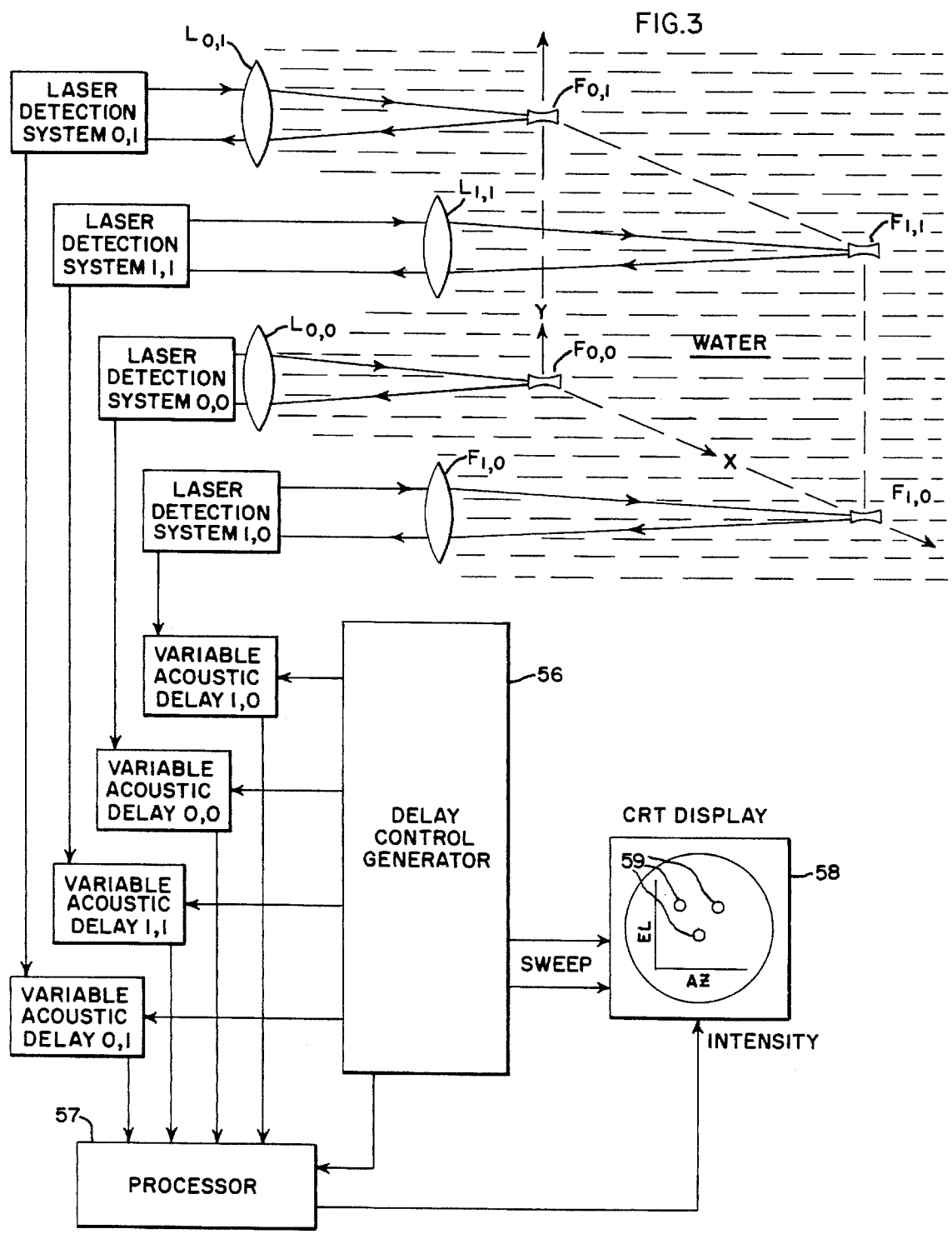
FIG. 3 is an area array of laser hydrophones.

A third embodiment of the invention taking the form of a two dimensional virtual array is illustrated in FIG. 3. In the FIG. 3 embodiment, the successive focal volumes are arranged in a vertical (XY) plane facing the target region with the target information displayed by an elevation versus azimuth display. While for simplicity only four focal volumes have been illustrated, the resolution by which individual targets are detected will be enhanced as the number of focal volumes is increased to a larger number.

Referring now to FIG. 3, four laser detection systems are shown, each having a position denoted by the X and Y positional coordinates (0,1; 1,1; 0,0; 1,0). Each detection system is arranged to act with a transmitting and receiving lens singularly identified ($L_{0,1}$ $L_{1,1}$ $L_{0,0}$ $L_{1,0}$). The focal volumes with which the lenses coact are distributed in a vertical plane facing the target region (as noted) and respectively bear the designations $F_{0,1}$; $F_{1,1}$; $F_{0,0}$; and $F_{1,0}$, corresponding to their spacial dispositions. Each laser detection system comprises the components illustrated in the FIG. 2 embodiment including a separate CW laser, a Bragg modulator, a photodetector and a phase detector. Each system thus provides an electrical output signal containing the phase modulation terms resulting from sonic wave passage through its respective focal volume. The electrical outputs from all systems are then supplied to a succession of variable acoustic delays. The variable acoustic delays also bear the positional subscripts 0,1; 1,1; 0,0; and 1,0. They are designed to be controlled by a delay control generator 56, a processor 57 which provides at its output a time variable signal derived from each laser detection system and suitable for area display. The delay sweep generator 56 is also coupled to a CRT display 58 wherein the elevation and azimuth of the individual targets 59 are shown. The formation of the display using the output from the processor and under sweep control by generator 56 is well known and will not be dealt with in detail herein.

While the invention has been illustrated in relation to two virtual array embodiments, it should be understood that other embodiments may be carried out utilizing the same inventive principles. In particular, the linear virtual array may be arranged with the focal volumes either in a line directed toward the target region as in the second embodiment or in a line broadside to the target region. The area array of the third embodiment also may take alternate forms. In addition, the concepts of the virtual area array of the third embodiment may be extended to a virtual three dimensional array, in which the focal volumes occur at the interstices of a regular cubical matrix. Expansion of the array in the Z dimension enhances directivity and reduces sensitivity to the backward wave as in the second embodiment.

The foregoing virtual arrays may be mechanically scanned or mechanically stationary and electrically scanned. The electrical scanning may be achieved by electrically adjusting the delays of the signal derived from the individual focal volumes on a real time basis.

The virtual arrays of laser hydrophones so far described are readily installed in surface or underwater vehicles. In each virtual array, the last element of physical hardware at the water interface may be the lenses used to focus the laser sampling beam upon the remote focal volumes of water and to collect light return from these focal volumes. Alternatively, the last element of physical hardware may be a protective transparent window behind which these lenses are installed. In either case the lenses or the protective window(s) may be arranged flush with the external surface of any underwater vehicle and thus need not interfere with its streamlining.

In addition, the extent of the apertures need not be large even for highly directional arrays and thus need not weaken a pressure hull. In practice, the lenses may be grouped into a tight package limited by the physical dimensions of the lenses themselves and the mirrors and beam splitters which make internal optical couplings to the lenses. The lenses however may be outwardly directed at widely divergent focal volumes of water. While the separations between lenses may be measured in centimeters, the separations between the focal volumes defining the virtual array may be measured in meters. Thus the dimensions of the virtual array may be adequate for high directivity while the extent of the transmitting aperture may be small.

In the virtual arrays so far described, it is desirable that both the sampling beam and scattered beam return associated with a given focal volume pursue closely spaced or identical paths. This generally reduces the problem of preserving phase front matching required to form the optical heterodynes at the optical detector. Thus it is generally most convenient to use spaced portions of the same lens for both transmitting the sampling beam to and for receiving the scattered return from a given focal volume. In certain cases, where identical focal lengths are involved, it may be convenient to use the same lens for four adjacent focal volumes. Clustering of lenses associated with spaced focal volumes, while normally convenient, is not mandatory, so long as it is practical to maintain all the lasers of the virtual array on a common rigid platform.

The virtual array configurations illustrated may be executed in several practical forms. For instance, while one may use the biaxial beam intersection technique to reduce noise, one may use coaxial transmitted and return beams and use time gating to restrict the reception of scattered light to light in the vicinity of the focal volume and to permit increased instantaneous laser powers. In addition, while the transmitted beam is subjected to Bragg modulation in the disclosed embodiments, one may also use the Bragg modulator to offset the reference beam rather than on the transmitted sampling beam. The narrowband filtering of the signal may also take other forms. In particular, filtering has been performed both at a 455 Khz intermediate frequency and at a 20 Khz intermediate frequency.

The arrays herein disclosed have been generally used as passive listening devices wherein the source of sound is a remote object. The foregoing arrays may also be used in a "sonar" ranging system wherein a pulsed source of sound is associated with the listening devices. In this event, reception of echoes simultaneously from all directions would allow a determination of their three dimensional positions.

The directionality of all the arrays herein described are consistent with conventional acoustic wave transmission principles taking into account the fact that the virtual positions of the individual sonic wave sensors are at the remote focal volumes wherein phase is being sensed.

The embodiment illustrated in FIG. 1 has been used to measure acoustic levels corresponding to a 50 Å peak to peak particle motion under the influence of 300–500 hertz acoustic waves. This sensitivity was achieved with a 1 watt argon laser acting in clear natural sea water. Where sensitivity is limited by photon noise, substantial increases in sensitivity are theoretically indicated with increased laser powers. Study has shown that mote and air bubbles as well as suspended particles of micron size return a significant portion of the transmitted laser signal. Thus, the invention is applicable to all natural bodies of water, including both fresh water and sea water, provided that the water is not so clouded as to preclude light transmission to the focal volumes at which the sonic waves are sensed.

What I claim as new and desire to secure by Letters Patent of the United States is:

1. A laser hydrophone for remote detection of sonic waves in water, comprising:
   (a) a laser producing a highly coherent, monochromatic optical carrier,
   (b) means for deriving from said laser a reference beam and a sampling beam,
   (c) means for focusing said sampling beam upon a remote focal volume of water to illuminate light scattering matter naturally suspended in the water and moving in synchronism with said sonic waves, the dimensions of said focal volume being small in comparison to the sonic wavelengths of interest,
   (d) an optical detector including optical means for forming the light scattering from said focal volume into a beam and coherently combining it with said reference beam at said optical detector to form an electrical heterodyne signal, phase modulated as a result of the vibration of said light scattering matter, and
   (e) means coupled to the output of said optical detector for measuring the phase of the optical carrier in the scattered light return for sensing the magnitude of vibratory motion of said light scattering matter and thereby the intensity of said sonic waves in said remote focal volume of water.

2. The apparatus set forth in claim 1 wherein the focused sampling beam and the rays from the scattered light return beam generally pursue separate paths in the water, intersecting only at said focal volume to provide an improved signal to noise ratio.

3. The apparatus set forth in claim 2 wherein:
   (a) the output of said laser and said scattered light return beam are collimated, and wherein
   (b) said means for focusing said sampling beam and said optical means for forming the scattered light return beam are provided by a common lens, said sampling beam prior to focusing and said scattered light return beam pursuing spaced paths parallel to the axis of said common lens and intersecting with spaced regions of said common lens.

4. The apparatus set forth in claim 1 wherein said means for focusing said sampling beam and said optical means for forming the scattered light return beam are provided by a common lens.

5. The apparatus set forth in claim 4 wherein:
   (a) the output of said laser is collimated, and wherein
   (b) said common lens collimates the scattered light return.

6. The apparatus set forth in claim 5 wherein:
   (a) said means for deriving a reference beam and a sampling beam is a first beam splitter, and wherein
   (b) a second beam splitter is provided for combining said reference beam with said scattered light return beam at said optical detector, said reference beam passing undeflected through said second beam splitter and said scattered light return beam being deflected by said second beam splitter.

7. The apparatus set forth in claim 6 wherein means are provided for increasing the path length of said reference beam so that the transit time of the reference beam from the laser to the photodetector approximates the transit time from the laser to the photodetector of light in the sampling and scattered light return beam.

8. The apparatus set forth in claim 1 having in addition thereto an optical modulator for causing a difference in frequency between the sampling beam and the reference beam, whereby an optical heterodyne is formed in said photodetector at a frequency suitable for electrical amplification and filtering.

9. An array of laser hydrophones for detecting sonic waves in water, said array having a virtual position in the water which is remote from the physical elements of said array and having virtual dimensions in the water unlimited by the dimensions of the physical elements of said array, said array comprising:
   (a) laser means for producing a highly coherent monochromatic optical carrier,
   (b) means for deriving from said laser means a plurality of pairs of mutually coherent reference beams and sampling beams,
   (c) means for focusing each of said sampling beams upon an associated focal volume of water to illuminate light scattering matter naturally suspended in the water and moving in synchronism with said sonic waves, the dimensions of each focal volume being small in comparison to the sonic wavelengths of interest and the spacing between said focal volumes being comparable to the sonic wave-lengths of interest,
   (d) a plurality of optical detectors each associated with one pair of reference and sampling beams, and each including optical means for forming the light scattered from the associated focal volume into a beam and coherently combining it with the paired reference beam to form an electrical heterodyne signal, phase modulated as a result of vibration of said light scattering matter,
   (e) means coupled to the output of each optical detector for measuring the phase of the optical carrier in the scattered light return for sensing the magnitude of vibratory motion of said light scattering matter and thereby the intensity of said sonic waves in said remote focal volumes of water, and
   (f) electrical signal processing means for combining the electrical outputs from said phase measuring means to form a composite electrical signal representing a parameter of said sonic wave.

10. An array of laser hydrophones as set forth in claim 9 wherein:

(a) said focal volumes are spaced along a line at fractional wavelength intervals of the sonic waves of interest, (b) said electrical signal processing means comprising:
  (1) delay means for inserting fractional wave delay increments from element to element in said array, and
  (2) summation means for combining the delayed signals from each element to achieve directivity as a function of the number of focal volumes and their spacial distribution.

11. An array of laser hydrophones as set forth in claim 9 wherein:

(a) said focal volumes are spaced over an area at fractional wavelength intervals of the sonic waves of interest, (b) said electrical signal processing means comprising:
  (1) delay means for inserting fractional wave delay increments from element to element in said array, and
  (2) summation means for combining the delayed signals from each element to achieve directivity as a function of the number of focal volumes and their spacial distribution.

12. An array of laser hydrophones as set forth in claim 9 wherein:

(a) said focal volumes are spaced over a volume at fractional wavelength intervals of the sonic waves of interest, (b) said electrical signal processing means comprising:
  (1) delay means for inserting fractional wave delay increments from element to element in said array, and
  (2) summation means for combining the delayed signals from each element to achieve directivity as a function of the number of focal volumes and their spacial distribution.

13. An array of laser hydrophones as set forth in claim 10 having high forward to backward discrimination wherein:

(a) said focal volumes are spaced along a line directed toward the target at approximately quarter wavelength intervals at the sonic wave of interest, (b) said electrical signal processing means comprising:
  (1) delay means for inserting quarter wave delay increments increasing element by element from the back to the front of the array, and
  (2) summation means for combining the delayed signals from each element to cancel the signals produced by sonic waves arriving from the backward side of the array and reinforce the signals produced by sonic waves arriving from the forward side of the array.

14. The combination set forth in claim 9 wherein:

(a) said means for focusing said sampling beam and said optical means for forming the scattered light return beam are provided by a common lens, the output of said laser means being collimated and said scattered light return beam also being collimated.

* * * * *